(12) United States Patent
Noble, Jr.

(10) Patent No.: US 6,356,634 B1
(45) Date of Patent: Mar. 12, 2002

(54) SYSTEM FOR PRE-RECORDING AND LATER INTERACTIVE PLAYBACK OF SCRIPTED MESSAGES DURING A CALL ENGAGEMENT

(75) Inventor: James K. Noble, Jr., Marietta, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

(21) Appl. No.: 09/257,435

(22) Filed: Feb. 25, 1999

(51) Int. Cl.[7] .............................. H04M 3/00; H04M 5/00
(52) U.S. Cl. ................ 379/266.07; 379/69; 379/88.11; 379/93.23; 704/260
(58) Field of Search .............................. 379/67.1, 88.11, 379/88.22, 88.13, 88.14, 88.15, 88.17, 88.23, 93.01, 93.17, 93.23, 93.25, 214, 265, 266, 267, 93.12, 266.07, 265.01, 265.02, 69, 88.16; 704/200, 246, 258, 260

(56) References Cited

U.S. PATENT DOCUMENTS

| | | | |
|---|---|---|---|
| 4,071,698 A | | 1/1978 | Barger, Jr. et al. |
| 4,697,282 A | | 9/1987 | Winter et al. |
| 4,797,911 A | | 1/1989 | Szlam et al. |
| 4,894,857 A | | 1/1990 | Szlam et al. |
| 5,070,525 A | | 12/1991 | Szlam et al. |
| 5,214,688 A | | 5/1993 | Szlam et al. |
| 5,309,505 A | | 5/1994 | Szlam et al. |
| 5,327,486 A | * | 7/1994 | Wolff et al. ............... 379/93.23 |
| 5,479,487 A | * | 12/1995 | Hammond ............... 379/88.22 |
| 5,511,112 A | | 4/1996 | Szlam et al. |
| 5,526,417 A | | 6/1996 | Dezonno |
| 5,544,230 A | | 8/1996 | Megyesi |
| 5,544,232 A | | 8/1996 | Baker et al. |
| 5,559,867 A | * | 9/1996 | Langsenkamp et al. ....... 379/69 |
| 5,561,711 A | | 10/1996 | Muller |
| 5,581,602 A | | 12/1996 | Szlam et al. |
| 5,594,791 A | | 1/1997 | Szlam et al. |
| 5,675,637 A | | 10/1997 | Szlam et al. |
| 5,717,739 A | | 2/1998 | Dyer et al. |
| 5,729,593 A | * | 3/1998 | Baker et al. ............. 379/88.19 |
| 5,991,723 A | * | 11/1999 | Duffin ........................ 704/260 |
| 6,014,429 A | * | 1/2000 | LaPorta et al. .......... 379/88.15 |
| 6,104,790 A | * | 8/2000 | Narayanaswami. ...... 379/93.25 |

* cited by examiner

Primary Examiner—Fan Tsang
Assistant Examiner—Roland G. Foster
(74) Attorney, Agent, or Firm—Bernstein & Associates, P.C.

(57) ABSTRACT

The present invention provides a communications system and maintenance system for telephone contact. The present invention is designed to be a stand-alone system used in concert with computers and public telephone switches that are well known in the telephone contact industry. The present invention may, if desired, be integrated into an existing telephone contact system or host program, or, it can be made available as a stand alone product. The communication system enables the telephone service representative to transparently deliver a prerecorded voice file to a party that is consistent in voice tone, quality, energy and pitch. The communication system also provides the telephone service representative with a viewable transcript of the actual voice being transmitted to the party. The maintenance system enables the telephone service representative to update and improve selected prerecorded voice files to ensure voice quality, energy, tone, and pitch of his/her recordings and management to approve and control quality before the recording is used within the system.

34 Claims, 6 Drawing Sheets

SYSTEM FOR PRE-RECORDING AND LATER INTERACTIVE PLAYBACK OF SCRIPTED MESSAGES DURING A CALL ENGAGEMENT

FIELD OF THE INVENTION

The present invention relates to a telephone contact system that enables a telephone representative to prerecord and subsequently replay a set of voice files based on a pre-created script to one or more parties. More particularly the invention relates to a telephone contact system that transparently presents the prerecorded voice script to the selected population and the text of that voice script to the telephone representative. The system can be used with inbound, outbound or blended calling systems.

BACKGROUND OF THE INVENTION

The telephone contact industry has long been aware of the importance of consistency in making successful telephone contacts. Consistency involves having the individual telephone representative make the same positive statement or impression to the last or current prospective customer he/she contacts as well as he/she did to the first prospective customer contacted. For the purpose of this disclosure, the term "party" will be used to describe the person the telephone representative calls or who calls the company who the representative represents. Such parties can include, but are not limited to, customers, prospective customers, individuals targeted by demographics who might be responsive to the message sought to be delivered by the representative, or any other person in communications with the TSR. The term "party" may, if desired, be extended to third parties who are contacted by medium not directly in communications with the TSR. An example of that type of medium would be the World Wide Web or Internet. The tone quality, pitch, energy, and enthusiasm of the telephone representative's voice has an enormous impact on the effectiveness of the telephone contact. Naturally the consistency, tone, and pitch quality of the telephone representative voice varies from the beginning of his/her work shift to the end of his/her shift and even from day to day. This variation in work performance is normal not only in the telephone contact industry but in all types of industries where humans are involved and the work is repetitious.

Attempts in the past have been made to rectify the variation in the telephone representative's consistency, tone, and pitch quality of his/her voice by prerecording a particular telephone representative's voice. This voice would then be played to a party. Other attempts include telephone response systems that have prerecorded voices to be replayed on demand by an operator who is monitoring the telephone communications between the party and the response system. The operator listens to the prospective party's response to a selected prerecorded voice message and responds with an approved answering phrase that has been determined to be the most effective for the type of response received. This type of telephone contact still relies on the telephone representative to audibly recognize the appropriate time to insert a prerecorded voice phrase in response to a prospective party's comments.

It would be desirable to have a telephone contact system that would allow a telephone representative to transparently deliver a set of prerecorded voice files to a selected population of parties that was consistent in voice quality, energy, tone, and pitch. Such a telephone contact system would enable the telephone representative to receive particular responses to selected questions from a plurality of senses i.e., audibly or visibly. The telephone representative would no longer totality rely on audible recognition of a party's response to a particular message.

SUMMARY OF THE INVENTION

The telephone contact industry is well aware of the importance of consistency in a telephone service representative's (TSR) voice and delivery tone, quality, and pitch. They are also keenly aware of how the TSR's voice quality may degrade over time or during a TSR's response to a question posed by a party during the conversation. Generally, effective telephone contact must be of high quality and dependable consistency from the first telephone contact to the last telephone contact placed by the TSR.

The present invention provides an interactive communication and maintenance system for telephone contact. The present invention is designed to be a stand-alone system used in concert with computers and public telephone switches that are well known in the telephone contact industry. The present invention may, if desired, be integrated into an existing telephone contact system or host program such as ATOMS® software program available from Noble Systems Corporation, Atlanta, Ga. The communication system enables the TSR to transparently deliver his/her own prerecorded voice file to a party that is consistent in voice tone, quality, and pitch. The maintenance portion of the present invention enables the TSR to update and improve selected prerecorded voice files to ensure voice quality, energy, tone, and pitch of his/her recordings and obtain management approval.

A preferred embodiment of the present invention commands and controls the interactive communication between the TSR and a party. The present invention is a communication system or program residing on the host system. The host system first establishes a communication link between the communication system and the party. The communication link may, if desired, be dedicated to inbound, outbound, or blended communication links to the party. The host system provides a stimulus to the communication system indicating a communication link is established. The communication system, responsive to the stimulus retrieves a selected voice and text file from the host system's memory. The communication system operatively presents the text file to the TSR and the voice file to the party. The communication system may, if desired, receive subsequent stimuli derived from the communication between the TSR and the party. The communications system responsive to the subsequent stimuli presents subsequent text files to the TSR and subsequent voice files to the party. The TSR monitors the voice file and any vocal response by the party. The TSR views the transcribed text of the voice file as it is being presented to the party. The TSR an also handle segments live, when needed.

The TSR's ability to monitor the voice and text file simultaneously enables the TSR to give an intelligent and cohesive response to questions or responses by the party to the voice file. This process of transmitting the voice file to the prospective party and the text file to the TSR is transparent to the party. The party receives the initial voice file and subsequent voice files that are of a desirable and effective voice quality, energy, tone and pitch. This process of transmitting voice files to the party and the text file to the TSR continues until the TSR, or the party terminates the telephone contact.

If the party asks a question or makes a response to the voice file, the TSR requests the communication system to extract an appropriate response from its memory. The communication system extracts from its memory the requested responsive voice and text file and transmits the voice file to the party and the text file to the TSR. If desired, the TSR may interrupt the transmission of the voice file and actually communicate live with the party.

A second embodiment of the present invention is a maintenance system that enables the TSR to record voice files, update existing voice files, and receive critiques of the voice files by the TSR's manager. The maintenance system provides software tools controlling the speed of the voice file playback, volume, fast forward, and reverse of the voice file. The maintenance file also provides an indexed counter that positionally or numerically notes the voice file as it is being played. The present invention can also edit out any excess silence or noise at the beginning and/or end of a file.

The TSR begins a recording session by communicating to the maintenance system a request for a particular campaign or sales script which may include one or more discrete cells of dialog. The TSR then sends a request to record a particular voice file. The TSR records the voice file using the script cells on the monitor and, using the provided tools, edits the voice file. When the TSR is satisfied with quality of the voice file, he/she may send a signal indicating that the voice file is ready for management review. The manager reviews the voice file and offers suggestions for improvement. The manager may also approve or disapprove the future use of the voice file. The process of the TSR recording a voice file, updating, and submitting the voice file for approval continues until all concerned parties are satisfied with the voice file. Once the voice file has gained the manager's approval, it is stored in a unique location the host system's memory for use by the appropriate TSR. This file can be recalled by the TSR when he/she enters her password and accesses the system and then recalls the script.

When taken in conjunction with the accompanying drawings and the appended claims, other features and advantages of the present invention become apparent upon reading the following detailed description of embodiments of the invention.

BRIEF DESCRIPTION OF THE DRAWINGS

The invention is illustrated in the drawings in which like reference characters designate the same or similar parts throughout the figures of which.

DESCRIPTION OF THE PREFERRED EMBODIMENTS

Before describing in detail the particular improved telephone service contact operation in accordance with the present invention, it should be observed that the invention resides primarily in a novel structural combination of conventional data/signal processing components, associated communications circuits, the command and control of the aforementioned components and circuits, and not in the particular detailed configuration thereof. Accordingly, the structure, command, control, and arrangement of these conventional components and circuits have, for the most part, been illustrated in the drawings by readily understandable block diagram representations and flow charts. The drawings show only those specific details that are pertinent to the present invention in order not to obscure the disclosure with structural details which will be readily apparent to those skilled in the art having the benefit of the description herein. For example, a public telephone switch has numerous connections to the structure containing the switch and numerous connections to modems housed in computers. Various portions of the public telephone switch connection to the computers have been simplified in order to emphasize those portions that are most pertinent to the invention. Thus, the block diagram and flow chart illustrations of the FIGURES do not necessarily represent the mechanical structural arrangement of the exemplary system, but are primarily intended to illustrate major software and hardware structural components of the system in a convenient functional grouping, whereby the present invention may be more readily understood.

Overview of the Present Invention

The preferred embodiment of the present invention is a system for interactively communicating text and voice between a telephone service representative (TSR) and a party. The present invention 10, FIG. 1 may be generally described from a top level prospective. The TSR (not shown) is properly logged onto one of a plurality of computers 12 or 14. The exact number of computers may vary depending on the desired size of the facility housing the computers and the present invention 10. For purposes of illustration only, communication between the TSR and other aspects of the present invention 10 are discussed using computer 12. The present invention 10 normally functions on one computer, such as a stand alone system used by a single person (e.g., at home or in a small office) or on a plurality of computers.

Figure 1:
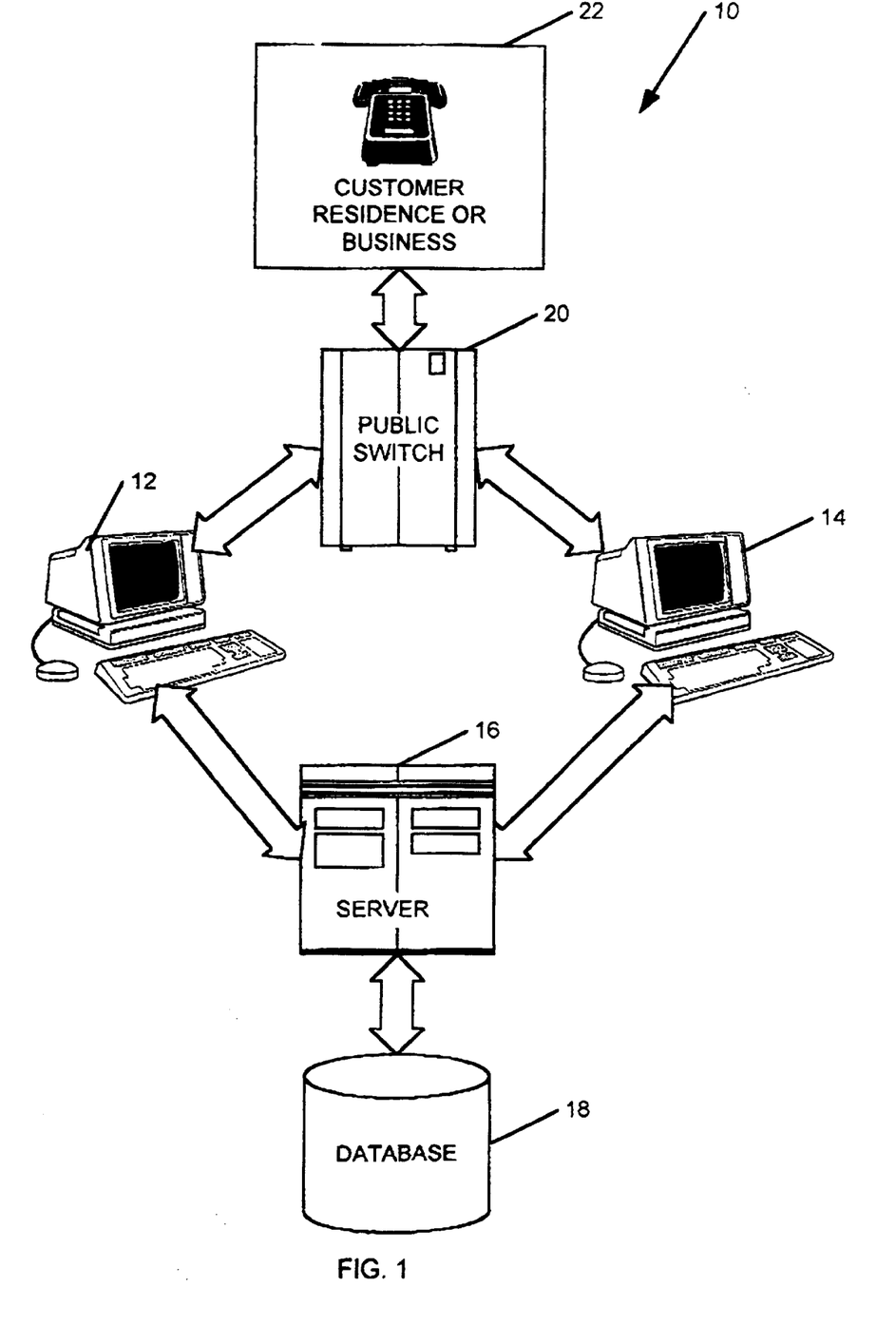
FIG. 1 illustrates a top level block diagram of a preferred embodiment of the present invention.

The TSR begins a telephone contact session by communicating a request via computer 12 to a server 16 to activate a selected host telephone contact program stored on database 18. The telephone contact program, activated by the server 16, is for a particular type of telephone campaign., which may be any of a variety of types known to those skilled in the art. The telephone contact program may, if desired, be dedicated to inbound, outbound, or blended telephone communication links to parties. The telephone contact program is presented to the TSR via the monitor of computer 12. The telephone contact program in concert with the server 16 may if desired, initiate the telephone call or receive the telephone call initiated by the server 16. The telephone contact program may, if desired, provide the TSR with information concerning the party 22. The TSR reviews this information and may, if desired, conduct the telephone contact without the aid of the present invention 10 or he/she may use the present invention 10 to communicate with the party 22. If the TSR desires and is approved to use the present invention 10 to communicate with the party 22, the TSR communicates the request to the telephone contact program. The telephone contact program establishes a communications link with the party 22 and the TSR as discussed above. The present invention 10 receives a stimulus from the telephone contact program indicating an inbound or outbound telephone communication link is in process via the public telephone switch 20. If desired, the telephone contact program may transmit the stimulus to the present invention 10 anytime during the communication link between the party and the TSR. The TSR may initiate the stimulus via the telephone contact program or the telephone contact program may automatically initiate the stimulus. The stimulus may, if desired, take the form of an electronic signal receivable by the present invention 10. The stimulus may also take the form of any other signal that enables the present invention 10 to function. The present invention 10, responsive to the stimulus displays the text portion of an approved prerecorded cell of information that is to be communicated to the party 22 on the TSR's computer monitor 12. When contact is made with the prospective party 22, the communication system transmits the voice portion of the approved prerecorded cell of information directly to the prospective party 22. The voice portion of the approved prerecorded cell of information is in the actual voice of the TSR who is conducting the current telephone contact. The TSR monitors the voice transmission to the party 22 while observing the text portion of the information cell being displayed on his/her computer monitor. If the party 22 responds in a selected manner to the voice portion of the information cell, the TSR may select a responsive subsequent information cell to be transmitted to the prospective party 22. The present invention 10 receives the subsequent request for voice cell transmission and again transmits the text portion of the subsequent cell of information to the TSR's computer monitor and the voice portion to the prospective party 22. This procedure continues until the TSR or the party terminates the telephone contact session. During a particular session the TSR may, if desired, terminate the prerecorded voice portion and communicate directly with the prospective party 22. The present invention 10 enables the TSR to transparently communicate with a prospective party 22 via the communication system. If desired, the present invention may be implemented at any stage or period of the telephone script. It may be more convenient or practical to implement the present invention 10 after the TSR has made voice contact with the party.

Detailed Process of the Contact of a Party

Figure 2:
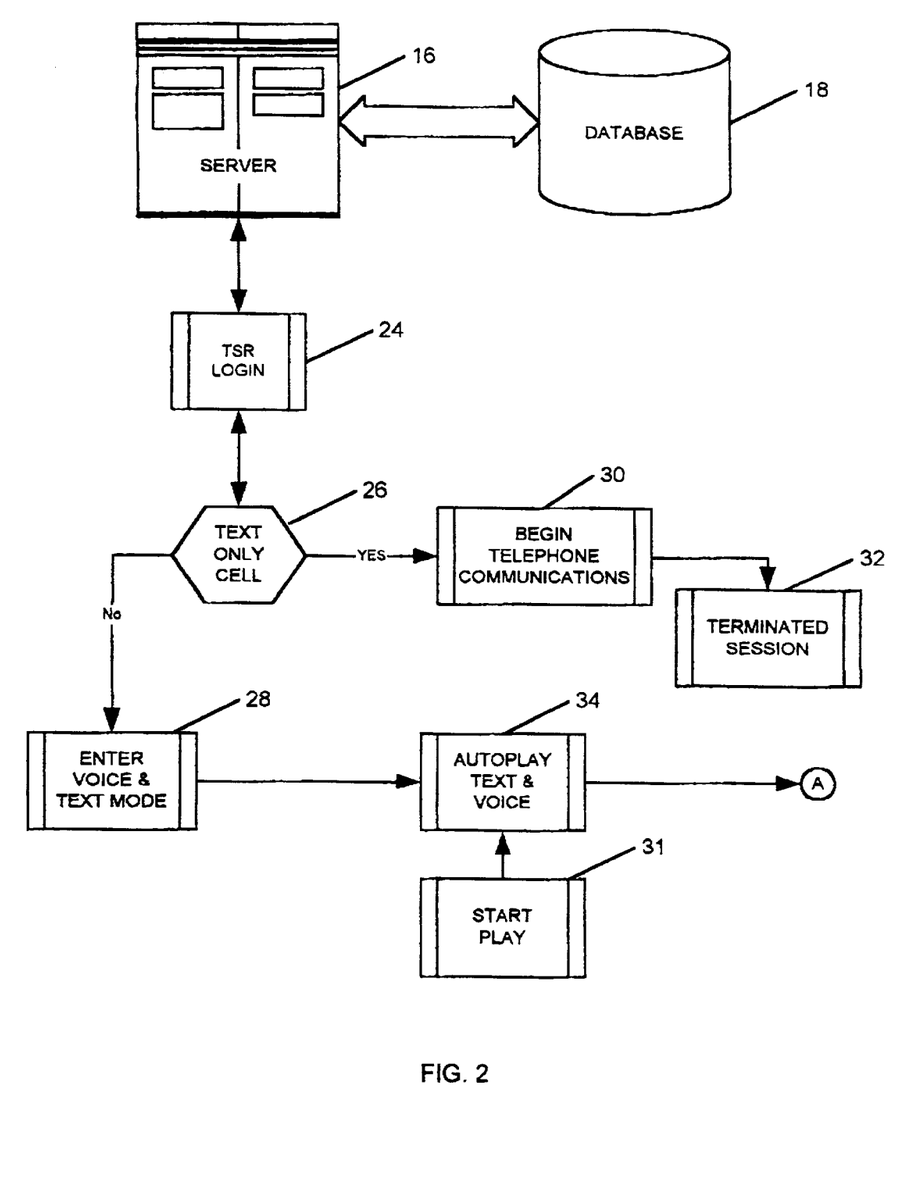
FIG. 2 illustrates a flow chart of the telephone contact operation of FIG. 1.

The present invention 10, shown in FIG. 2, is a communications system that, in part, manages the interaction between the TSR and the prospective party 22. The TSR logs-in 24 with the communications system via the computer 12. The log-in process may, if desired, be password coded using any type of encryption technique known to those skilled in the art of protecting the integrity of the TSR and the present invention 10. The TSR requests the server 16 to activate a telephone contact program stored in the database 18. The telephone contact program presents to the TSR, via computer 12's monitor, a script that is to be used to conduct the telephone contact. The script contains a plurality of cells that have information or options concerning the text and voice files of the telephone contact campaign. These cells may, if desired, be question cells, update cells, text cells, voice and/or memory storage cells. The text and voice files are discussed in this section and the question and update cells are discussed hereinbelow.

The TSR reviews the script and decides whether to conduct the telephone contact in the text only mode 26 or in the voice and text mode 28. The present invention 10 correlates the TSR to the particular script he/she has requested to determine if the TSR is authorized access to this particular script. If the TSR is authorized access, he/she may conduct the telephone contact using the voice and text mode. If the TSR is not authorized access, the present invention 10 does not activate the voice and text mode for this particular TSR. When the TSR is not authorized to use the voice and text mode, he/she is only allowed to conduct the telephone contact 30 using the text only mode. The text mode allows the TSR to read and speak the text of the prepared telephone contact to the prospective party 22 and terminate the session when desired 32.

The voice and text mode 28 enables the TSR to autoplay the text and voice 34 simultaneously. If desired the TSR may manually activate the start the play 31 of the text and voice files. In either case the telephone contact program commands the server 16 to auto dial a selected party 36, FIG. 3, to receive a particular telephone campaign The telephone contact program automatically receives selected confirmation 38 that the telephone dialed has indeed gone off hook. The telephone contact program also determines if the dialed prospective party 22 is a real person or an answering machine. If the response to the dialed number is the answering machine, the call is terminated with or without a message being left. If the response is a human voice, the telephone contact program transmits a stimulus as discussed above to the present invention 10. The present invention 10 responsive to the stimulus activates an approved prerecorded voice file 40 to be audibly transmitted to party 22. In concert with the transmission of the voice file, the present invention 10 transmits the text portion 42 of the file to the TSR.

Figure 3:
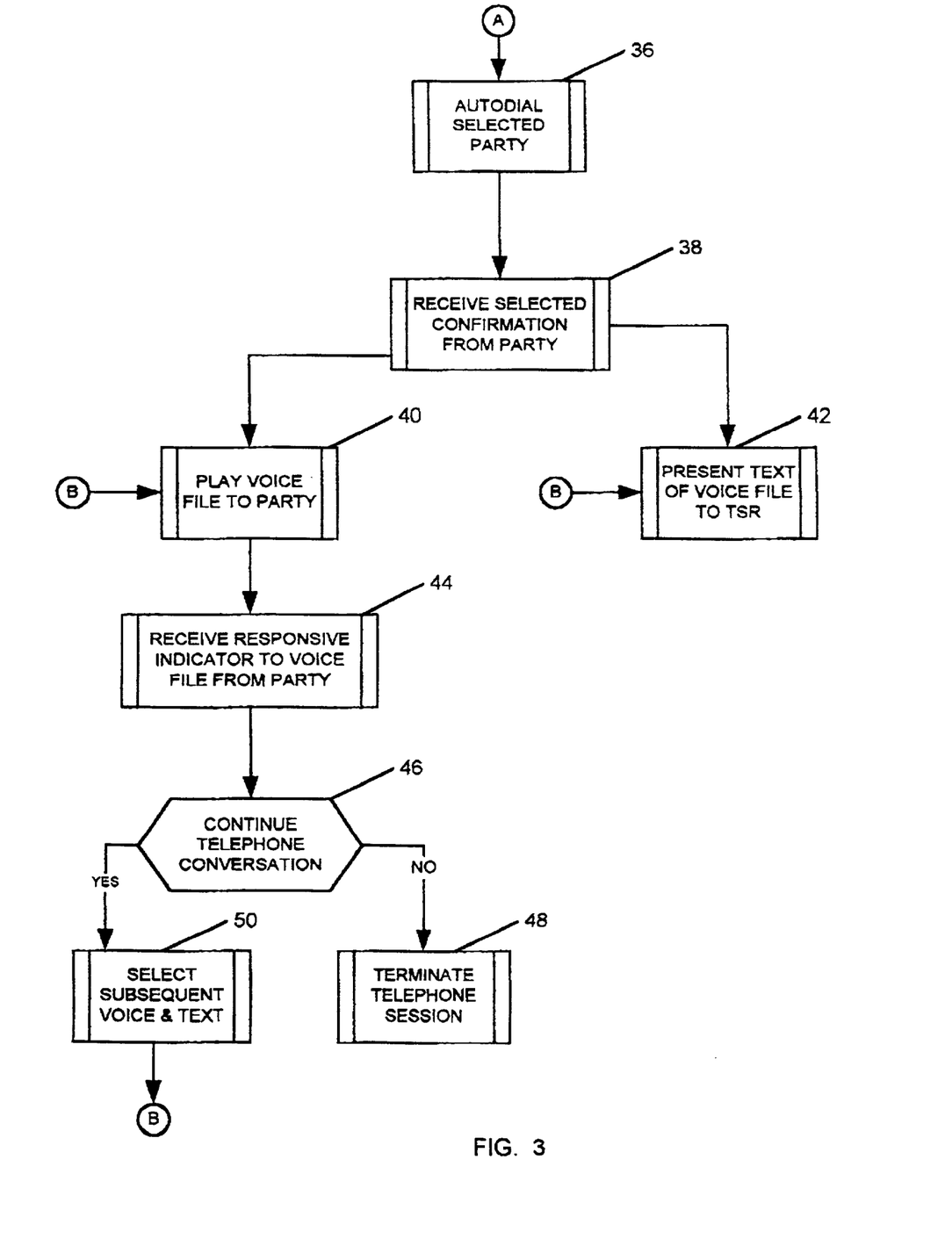
FIG. 3 illustrates a flow chart continuing the telephone contact operation of FIG. 2.

The voice files are generally scripted to induce a response from the prospective party 22. The TSR is monitoring both visually, reading the text as display on the monitor, and audibly via the telephone connection to the party 22. The TSR may, if desired, use a highlight program that positionally correlates the text file to the voice file. The highlighted program enables the TSR to follow the highlighted or "greyed out" text displayed on the computer monitor as the voice file is being played. The party 22 makes an indicative response 44 either positively or negatively to the voice file. In either case, the TSR has a plurality of prerecorded cells that are responsive to the prospective party 22. Once the TSR receives the indicative response 44 he/she may elect to continue the telephone contact 46 by selecting subsequent voice and text files 50 to be played to the prospective party 22 or terminate the telephone contact session 48. Once the TSR has initiated a particular voice and text file, those particular files may not be replayed during the current communication with the prospective party 22. This process continues until the TSR has completed the telephone contact to his/her satisfaction or the telephone session is terminated.

The Maintenance of the Voice and Text Files

Figure 4:
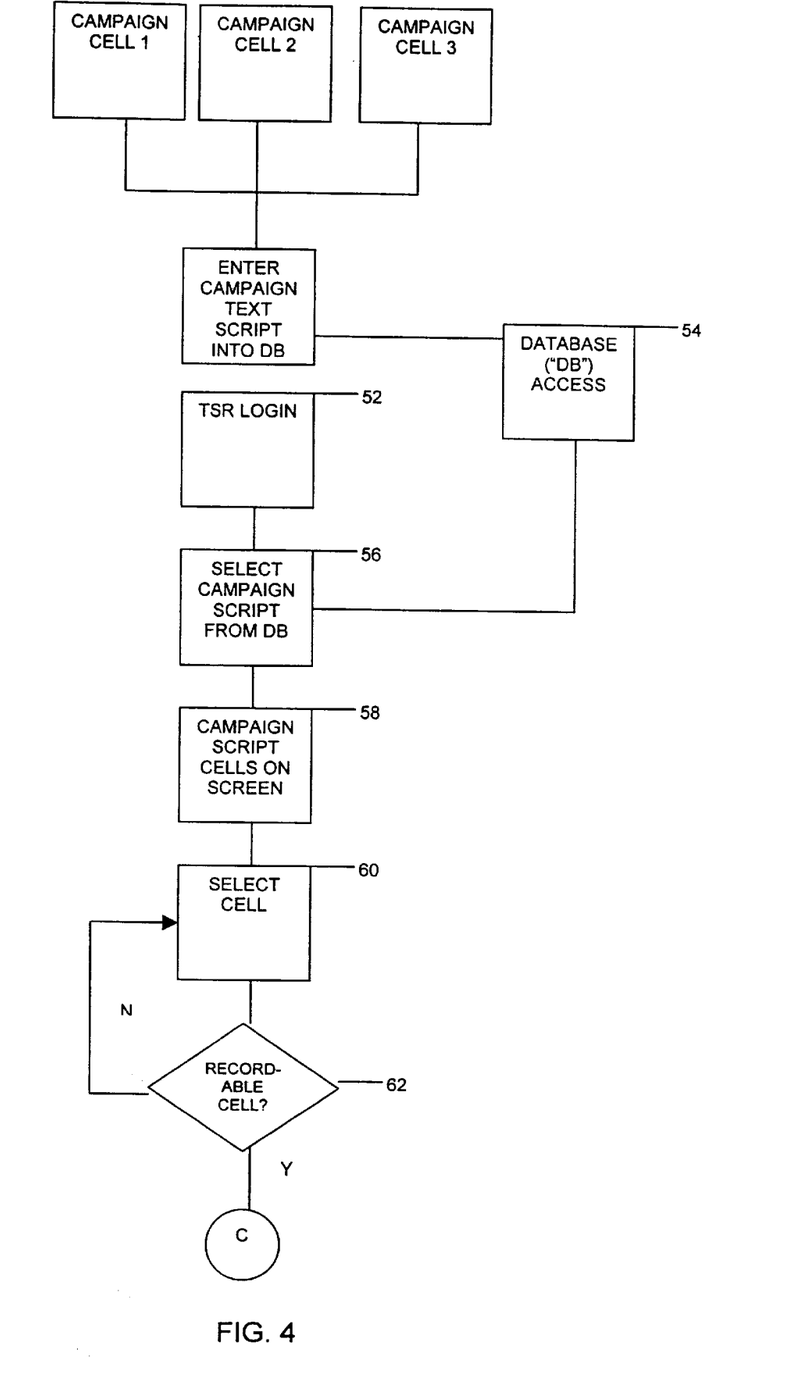
FIG. 4 illustrates a flow chart of a second embodiment of the present invention.

The second embodiment of the present invention 10 is a maintenance system that may, if desired, command and control the maintenance of the above discussed voice and text files. The maintenance system is stored in the database 18 and activated by the TSR. The TSR is only allowed to perform maintenance on his/her own voice file. The TSR's voice file is derived from a manager approved text. The text may, if desired, be first written by the TSR's manager or any other person who is authorized to draft appropriate text for recording by the TSR. The maintenance system requires the TSR to be properly togged in 52. The system cross checks the logged-in TSR with the identification number of the selected 56 or desired voice file. If the TSR is not authorized to perform maintenance on the voice file, the access 54 to those files is denied. The TSR may, if desired, create new voice files and store them on the database 18 for future use.

The TSR may now view the script 58 containing cells of information that are used in the maintenance of the script.

Figure 5:
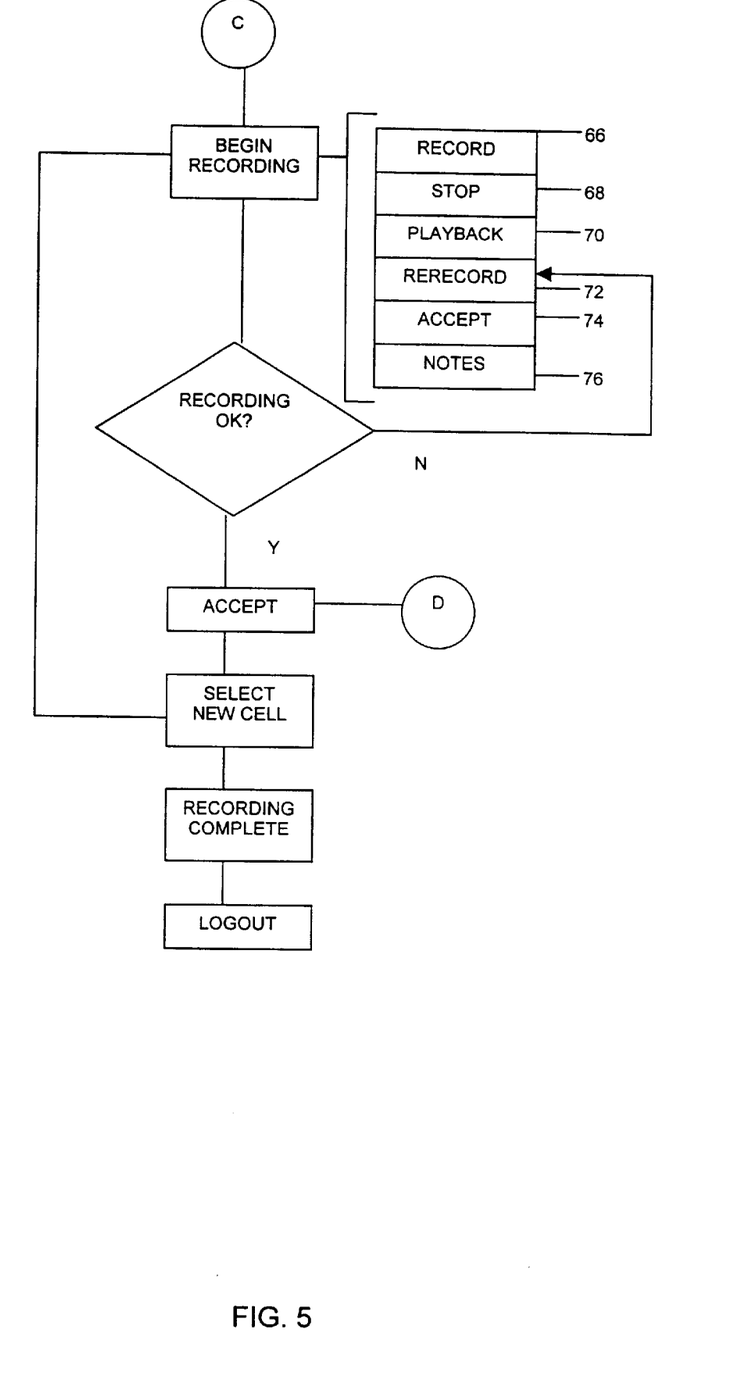
FIG. 5 illustrates a flow chart of the maintenance operation of FIG. 4.

The TSR has the option of selecting which cells he/she chooses to access 60. If the TSR selects a recordable cell 62, the maintenance system responsive to his/her selection begins recording the voice portion of this cell 64. The TSR is in control of the recording by activating one of a plurality of on-monitor software buttons. The software buttons may, if desired, be record 66, stop 68, playback 70, record again 72, accept 74, and notes 76. These software buttons perform their indicated tasks of recording the TSR's voice, stopping the recording session, playing back the recording session, re-recording the session, accepting the voice and tone quality of the recording session, and the TSR's notes. If desired other types of on-screen software buttons may be added to enhance the TSR's ability to edit the voice recording. Examples of other types of software buttons are speed and volume control, fast forward and reverse, voice index or counter correlated to the text, editing sound voids from beginning or trailing portions of the file, video imaging of the TSR, voice pitch control. The acceptance 80 of the voice and tone quality of the recording, at this level, is by the TSR only and is subject to a manager's approval.

Figure 6:
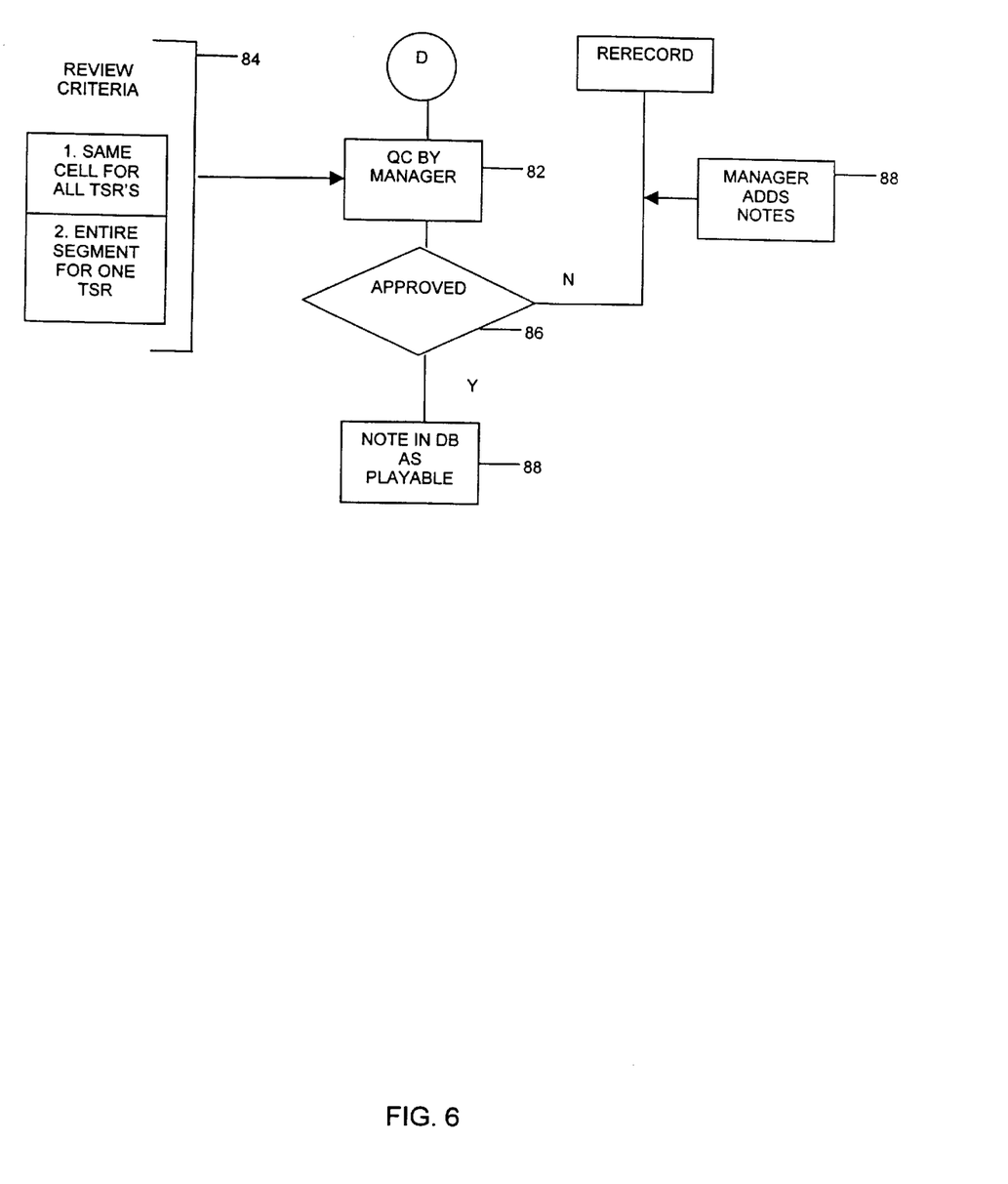
FIG. 6 illustrates a flow chart continuing the maintenance operation of FIG. 5.

The TSR's manager acts as a reviewer or quality control 82 of the newly recorded voice message. The manager may, if desired, use a review criterion that may include the same cell for all TSR's or use the entire segment for one TSR. The manager also provides suggestions 88 for an improved voice recording. The voice recording along with the manager's suggestions are transmitted back to the appropriate TSR for review wherein the TSR updates the recording and re-transmits the recording back to the manager for further scrutiny. This process continues until the respective concerned parties are satisfied with the voice recording 86. The manager may also attach notes concerning the voice recording 88 to further improve the TSR's use of the recording. These notes are stored on the database 18 and may be reviewed each time the voice recording is played by the TSR.

The present invention 10 is primarily designed for use in conjunction with a shell telephone contact program that provides and maintains monitor menus containing the rudiments of a telephone contact program. An example of that type of shell telephone contact program is the ATOMS® software program. The present invention 10 may, if desired, be a stand-alone communications system to be compiled into any desired commercially available telephone contact program. The present invention 10 may also be used in conjunction with any other type of communication medium that allows communications between one or more parties.

The best mode of operation is for the TSR to be in communication with the present invention 10 via a shell program. The TSR uses the shell program as a vehicle to aid in telephone contact. The TSR request the communications system stored in the memory of at least one computer a particular approved voice and text file. The communication system responding to the request selects an appropriate voice and text file. The communications system transmits the text file to the TSR and the voice file to the selected prospective party 22. The prospective party 22 may, if desired, respond to the voice file. The TSR, transparent to the prospective party 22, selects a second voice file that is responsive to the party. This process continues until the TSR terminates the telephone contact.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims, means-plus-function clause is intended to cover the structures described herein as performing the recited function and not only structural equivalents but also equivalent structures. Thus, as an analogy, although a nail and a screw may not be structural equivalents in that a nail employs a cylindrical surface to secure wooden parts together, whereas a screw employs a helical surface, in the environment of fastening wooden parts, a nail and a screw may be equivalent structures.

I claim:

1. A system for interactively communicating text and voice between a selected first user and a second user via telephone communications, the system providing means for interpreting commands and user interconnection, comprising:
   a) a computer having a memory;
   b) a communications program stored in said memory, said communications program receiving a selected contact stimulus from the system;
   c) said communications program responsive to said selected contact stimulus, retrieves from said memory the selected first user's voice file and a replicated text file;
   d) said communications program operatively presents said replicated text file to the first user and said voice file to the second user;
   e) said communications program operatively receives a subsequent contact stimulus derived from communication between the first and second user;
   f) said subsequent contact stimulus being generated by the first user in response to the second user's communication;
   g) said communications program responsive to said subsequent contact stimulus presents a subsequent replicated text file to the first user and a subsequent voice file to the second user;
   h) wherein said communications program transparently presents said subsequent voice file to the second user;
   i) wherein said communications program operatively receives said subsequent contact stimuli from the first user;
   j) wherein said communications program operatively presents said replicated text file to the first user and pauses to await an indicator from the first user to present said voice file to the second user;
   k) wherein said communications program determines the first user's authorization to activate selected replicated text and selected voice files;
   l) wherein said communications program correlates indicators to selected replicated text and selected voice files; and
   m) wherein said communications program prevents selected replicated text and selected voice files being repeated during a selected communication period between the first and second user;
whereby said communications program interactively responds to the communication between the first and second user.

2. The system of claim 1, wherein said subsequent contact stimuli reflects transparent communication between the first and second user.

3. The system of claim 1, wherein said subsequent contact stimuli reflects audible communication between the first and second user.

4. The system of claim 1, wherein said communications program operatively responds to a request from the first user, said program presents selected replicated text to the first user.

5. The system of claim 4, wherein said communications program prevents selected voice files from being repeated during a selected communication period between the first and second user.

6. The system of claim 5, wherein said voice files are selected from an approved list of voice files.

7. The system of claim 1, further comprising:
   a) a maintenance program stored in said memory;
   b) said maintenance program in communication with the first user;
   c) a voice file request transmitted from the first user to said maintenance program, said maintenance program operatively responsive to said request;
   d) said maintenance program audibly transmitting said voice file to the first user for updating; and,
   e) said maintenance program operatively responding to the updated voice file.

8. The system of claim 7, wherein the first user selects a voice file from a plurality of voice files presented by said maintenance program.

9. The system of claim 8, wherein said maintenance program activates said selected voice file.

10. The system of claim 9, wherein said manager disapproves the quality of said updated voice file.

11. The system of claim 9, wherein said manager approves the quality of said updated voice file.

12. The system of claim 9, wherein said manager suggests improvements to the quality of said updated voice file.

13. The system of claim 12, wherein said maintenance program operatively responding includes speed and volume control of said voice file.

14. The system of claim 13, wherein said maintenance program operatively responding includes fast forward and reverse control of said voice file.

15. The system of claim 14, wherein said maintenance program operatively responding includes indexing said voice file with a counter.

16. The system of claim 15, wherein said maintenance program operatively responding includes editing leading and trailing portions of said voice file.

17. The system of claim 16, wherein said maintenance program operatively responding includes video imaging of said voice file.

18. The system of claim 17, wherein said maintenance program operatively responding includes pitch control of said voice file.

19. The system of claim 18, wherein said maintenance program operatively responding includes masking the voice of the first user of said voice file.

20. A system for interactively communicating text and voice between a first user initiating a telephone call and a second user receiving the telephone call, comprising:
   a) a computer having a memory;
   b) a communications program stored in said memory, said communications program commanding at least one voice file and a text file replicated from said voice file stored in said memory;
   c) said communications program responsive to a request from the first user to communicate with the second user, said communications program retrieves from said memory said voice file and said replicated text file;
   d) said communications program operatively presents said text file to the first user and said voice file to the second user;
   e) said communications program operatively responds to the first user providing a first indicator derived from monitored communications with the second user;
   f) said communications program presents a subsequent text file to the first user and a subsequent voice file to the second user in accordance with said first indicator,
   g) a maintenance program stored in said memory;
   h) said maintenance program in communication with the first user;
   i) a voice file request transmitted from the first user to said maintenance program, said maintenance program operatively responsive to said request;
   j) said maintenance program audibly transmitting said voice file to the first user for updating;
   k) said maintenance program operatively responding to the updated voice file;
   l) said maintenance program providing a selected a voice file from a plurality of voice files;
   m) said maintenance program activates said selected voice file;
   n) said manager disapproves the quality of said updated voice file;
   o) said manager approves the quality of said updated voice file; and,
   p) said manager suggests improvements to the quality of said updated voice file,
   whereby said program manages the interactive communication between the first user receiving text and the second user receiving voice.

21. The system of claim 20, wherein said communications program operatively presents said replicated text file to the first user and pauses to await an indicator from the first user to present said voice file to the second user.

22. The system of claim 21, wherein said communications program determines the first user's authorization to activate selected text and selected voice files.

23. The system of claim 22, wherein said communications program correlates indicators to selected text and selected voice files.

24. The system of claim 23, wherein said communications program prevents selected text and selected voice files being repeated during a selected communication period between the first and second user.

25. The system of claim 24, wherein said communications program operatively responds to a request from the first user, said program presents selected text to the first user.

26. The system of claim 25, wherein said communications program prevents selected voice files from being repeated during a selected communication period between the first and second user.

27. The system of claim 26, wherein said voice files are selected from an approved list of voice files.

28. The system of claim 27, wherein said maintenance program operatively responding includes speed and volume control of said voice file.

29. The system of claim 28, wherein said maintenance program operatively responding includes fast forward and reverse control of said voice file.

30. The system of claim 29, wherein said maintenance program operatively responding includes indexing said voice file with a counter.

31. The system of claim 30, wherein said maintenance program operatively responding includes editing leading and trailing portions of said voice file.

32. The system of claim 31, wherein said maintenance program operatively responding includes video imaging of said voice file.

33. The system of claim 32, wherein said maintenance program operatively responding includes pitch control of said voice file.

34. The system of claim 33, wherein said maintenance program operatively responding includes masking the voice of the first user of said voice file.

* * * * *